United States Patent
Ikeda et al.

(10) Patent No.: US 8,514,681 B2
(45) Date of Patent: Aug. 20, 2013

(54) RECORDING MEDIUM, ADDRESS GENERATING AND DETECTION METHOD, AND REPRODUCTION AND RECORDING APPARATUS

(75) Inventors: Masakazu Ikeda, Odawara (JP); Koichiro Nishimura, Yokohama (JP); Yutaka Nagai, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 703 days.

(21) Appl. No.: 12/605,831

(22) Filed: Oct. 26, 2009

(65) Prior Publication Data
US 2010/0202276 A1 Aug. 12, 2010

(30) Foreign Application Priority Data
Feb. 12, 2009 (JP) ................. 2009-029298

(51) Int. Cl.
G11B 7/00 (2006.01)
G11B 7/24 (2013.01)

(52) U.S. Cl.
USPC ............ 369/53.29; 369/44.13; 369/30.1; 369/275.3

(58) Field of Classification Search
USPC .......... 369/30.01, 30.03, 30.18, 47.22, 59.25, 369/375.3, 44.13, 275.2, 47.27, 47.1, 53.21, 369/53.22
See application file for complete search history.

(56) References Cited

U.S. PATENT DOCUMENTS

| | | | |
|---|---|---|---|
| 8,159,906 B2 | 4/2012 | Ikeda et al. | |
| 8,289,820 B2 | 10/2012 | Ikeda et al. | |
| 2004/0174802 A1 | 9/2004 | Suzuki | |
| 2004/0264694 A1 | 12/2004 | Kim et al. | |
| 2009/0175151 A1* | 7/2009 | Miyashita et al. | 369/112.23 |
| 2009/0180361 A1* | 7/2009 | Nakata et al. | 369/30.18 |
| 2010/0214898 A1 | 8/2010 | Fukushima et al. | |
| 2012/0300609 A1* | 11/2012 | Ikeda et al. | 369/275.3 |
| 2012/0307609 A1* | 12/2012 | Ikeda et al. | 369/44.13 |

FOREIGN PATENT DOCUMENTS

| | | |
|---|---|---|
| JP | 2008-041243 | 2/2008 |
| JP | 2008-523534 | 7/2008 |
| KR | 10-2005-0099954 A | 10/2005 |
| WO | WO 2006/061736 A1 | 6/2006 |
| WO | WO 2008/060103 A1 | 5/2008 |
| WO | WO-2008060104 A1 | 5/2008 |
| WO | WO 2009/066453 A1 | 5/2009 |
| WO | WO 2009/072305 A1 | 6/2009 |

OTHER PUBLICATIONS

European Search Report issued in European Patent Application No. EP 09174355.9 dated Apr. 23, 2010.
European Office Action issued in European Patent Application No. 09 174 355.9 dated Jun. 5, 2012.
Japanese Office Action, and English translation thereof, issued in Japanese Patent Application No. 2009-029298 dated Jan. 4, 2012.

* cited by examiner

*Primary Examiner* — Wayne Young
*Assistant Examiner* — Dionne Pendleton
(74) *Attorney, Agent, or Firm* — McDermott Will & Emery LLP

(57) ABSTRACT

A recording medium, an address generating method, an address detection method and a recording and reproduction apparatus capable of extending the wobble address without any considerable wobble restructuring are disclosed. Virtual bits not recorded in the disc and expressed by the difference of the rule or the presence or absence of the information embedded in a part or the whole of the wobble address are generated. Thus, the extended address can be obtained without changing the number of bits of the address embedded in the wobble.

5 Claims, 12 Drawing Sheets

RECORDING MEDIUM, ADDRESS GENERATING AND DETECTION METHOD, AND REPRODUCTION AND RECORDING APPARATUS

INCORPORATION BY REFERENCE

The present application claims priority from Japanese application JP2009-029298 filed on Feb. 12, 2009, the content of which is hereby incorporated by reference into this application.

BACKGROUND OF THE INVENTION

This invention relates to a recording medium such as optical disc having an address recorded therein, a method of generating and detecting the address in the optical disc, and a recording and reproduction apparatus for recording and reproducing the data in the recording medium.

In JP-A-2008-41243, FIG. 6 shows the correlation of the address information of a Blu-ray Disc, in which paragraph [0010] contains the description that "the address unit number (AUN), as shown in FIG. 6, collaborates with both the physical sector number and the physical ADIP (Address In Pregroove) address, and therefore, can be effectively used as reference information to search for the recording position". In FIG. 6 of this patent document, the physical sector number (PSN) assigned one address by sector and the physical ADIP address (PAA) embedded in the wobble hold the relation 32*PSN=3*PAA. Nevertheless, the five PSN bits including bits 31 to 27 are not assigned any bit corresponding to PAA.

In the case where PSN increases beyond the data amount conventionally expressed in 27 bits in the bit assignment described in JP-A-2008-41243, the number of PAA bits to be embedded in the wobble would run is extended, a considerable restructuring of the wobble address configuration would be required.

SUMMARY OF THE INVENTION

The object of this invention is to provide a recording medium, an address generation and detection method, and a recording and reproduction apparatus in which the wobble address can be extended without any considerable restructuring of the wobble configuration.

In order to solve the problem described above, according to this invention, virtual bits expressed by the presence or absence or the difference in the rule of the information embedded in a part or the whole of the wobble address but not recorded in the disc are generated.

According to this invention, the address can be extended with the bit configuration of the conventional wobble address structure.

Other objects, features and advantages of the invention will become apparent from the following description of the embodiments of the invention taken in conjunction with the accompanying drawings.

DESCRIPTION OF THE EMBODIMENTS

Embodiments of the invention are described below with reference to the accompanying drawings.

Figure 1:
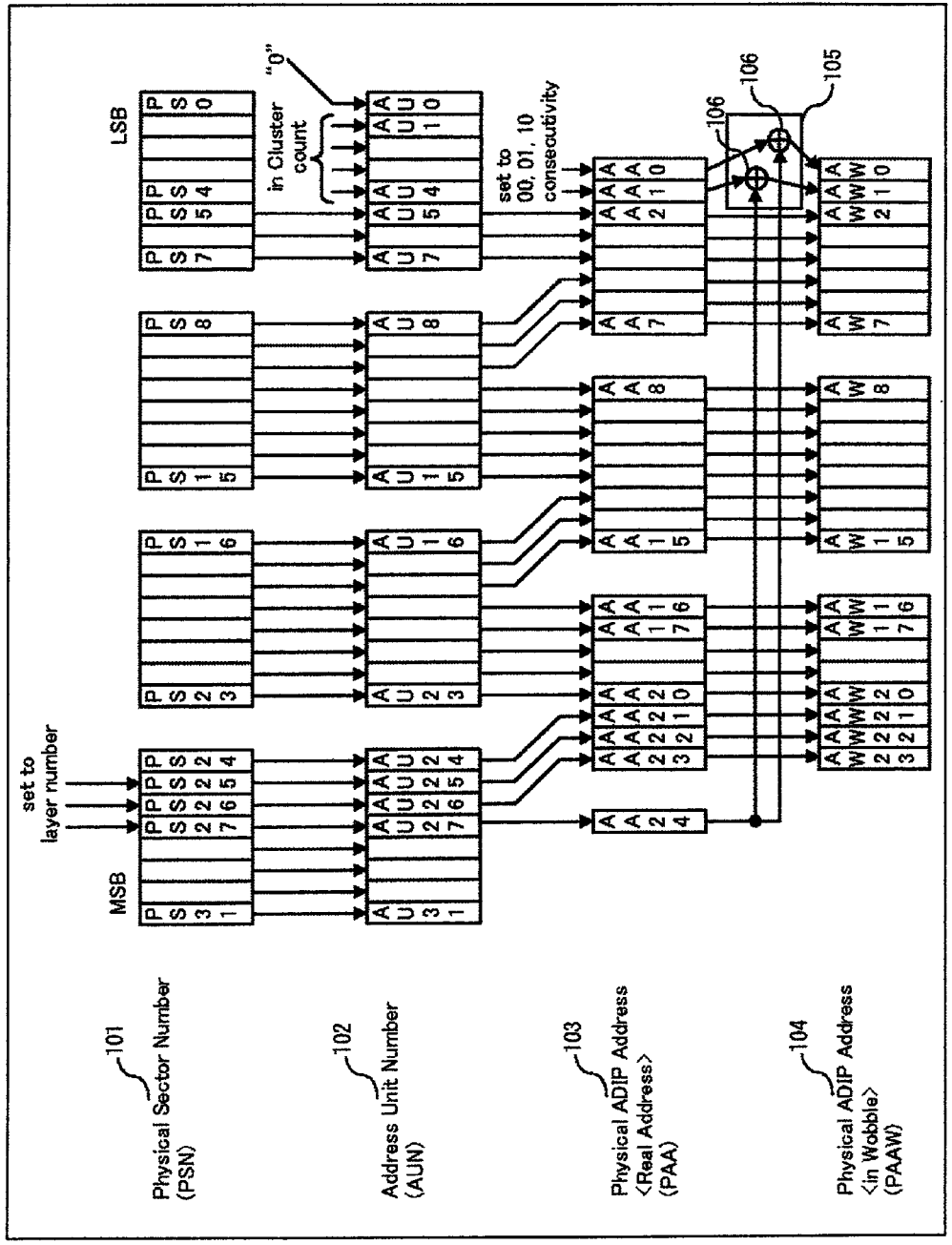
FIG. 1 is a diagram showing the correlation of the addresses of a multilayer optical disc according to a first embodiment of the invention.

FIG. 1 is a diagram showing the address correlation of a multilayer optical disc according to a first embodiment of the invention. Reference numeral 101 designates the physical sector number (hereinafter PSN) which is the number of each physical sector, numeral 102 an address unit number (hereinafter AUN) constituting an address embedded in the data by cluster, numeral 103 a wobble-related real physical ADIP address (hereinafter PAA), numeral 104 an address (hereinafter PAAW) actually embedded in the wobble of the physical ADIP address, numeral 105 a scramble circuit, and numeral 106 an exclusive-OR circuit (Ex-OR). In the shown case, the most significant three bits of the PAA 103 are assigned to the layer number and the conventional 24-bit PAA is extended by one bit. Also, the bit information of PAA24 constituting virtual bits for address extension is embedded in the wobble as the information related to the least significant two bits of PAA. In the conventional 24-bit PAA structure, assume that 3 bits are assigned as the layer number, 19 bits as the cluster number and 2 bits as the in-cluster count value. Then, the data can be assigned to the layer numbers of up to eight layers and the data with data capacity of 32 gigabytes (64 Kbytes×$2^{19}$) for each layer. In the high-density optical disc exceeding 32 gigabytes per layer, however, although the address can be assigned to the data having the capacity of 64 gigabytes (64 Kbytes×$2^{20}$) per layer by extending the cluster number to 20 bits, the layer number is reduced to 2 bits, and therefore, the address of more than five layers cannot be generated. For this reason, the layer number is extended by one bit, so that the addresses of up to eight layers are generated with the layer number of three bits as in the prior art.

Now, a method of generating the address shown in FIG. 1 is explained. In the address range of PSN 28 bits (remaining four bits not used), PAA 25 bits are assigned as an address range on the wobble. Since the number of bits of the address embedded in the disc using the wobble is limited to 24 bits, however, the information for the most significant PAA 24 bits is embedded in other bits as virtual address bits. According to this embodiment, the bit PAA24 are input as control bits to determine the on/off state of the scramble process of the scramble circuit 105, and the low-order two PAA bits (PAA1-0) are scrambled and embedded in the wobble. As an example of the scramble process, the exclusive-OR 106 is used. Then, in the case where the bit PAA24 is "0", the bits PAA1-0 are counted as 0, 1, 2, 0, 1, 2, . . . as in the prior art, while in the case where the bit PAA24 is "1", the resulting value after exclusive-OR operation is counted as 3, 2, 1, 3, 2, 1, . . . . Thus, the bits PAAW1-0 output from the scramble circuit 105 are actually embedded in the wobble. As a result, the virtual bit PAA24 is not required to be embedded in the wobble.

Figure 2:
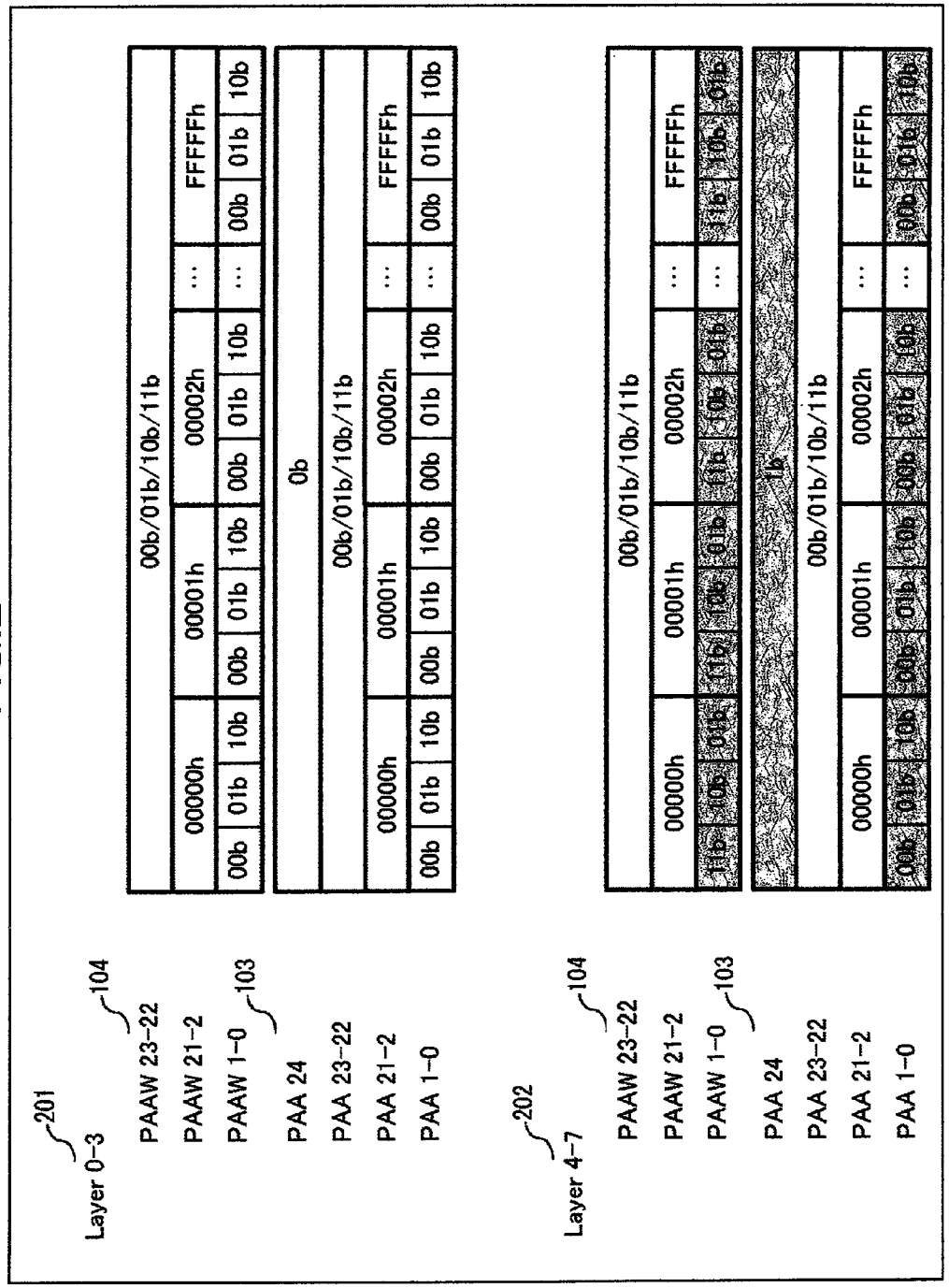
FIG. 2 is a timing chart for address detection according to the first embodiment of the invention.
Figure 3:
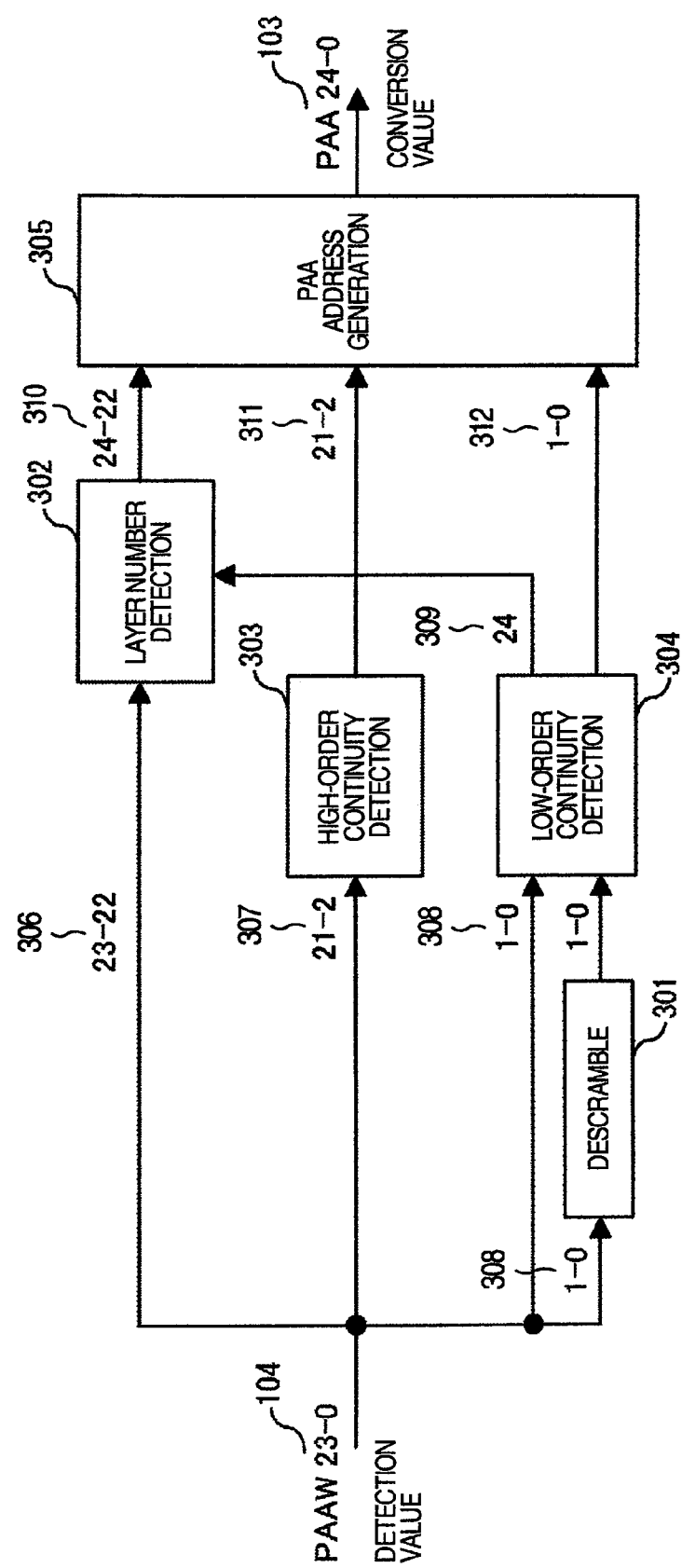
FIG. 3 is a diagram showing a detection circuit for detecting the address according to the first embodiment of the invention.

Next, a method of detecting the address PAAW embedded in the wobble is explained with reference to the timing chart of FIG. 2 and the diagram of FIG. 3 showing an example of the detection circuit. As a method of detecting the wobble address, a detection error and a detection failure are taken into consideration. Thus, the addresses are generated by being continuously detected for protection. For this purpose, the continuity of the low-order address bit PAAW1-0 (308) is checked to restore the virtual bit PAA24 (309). In FIG. 3, a low-order continuity detection circuit 304 is supplied with the address bits PAAW1-0 detected from the wobble and the address bits 1-0 descrambled by the descramble circuit 301 shown in FIG. 3. In the descramble circuit 301, the bits are descrambled by an exclusive-OR 106 at the time of address generation, and therefore, the result of exclusive-OR operation of "1" and the bits PAAW1-0 is output as the bits after the descramble operation. In view of the fact that the virtual bit PAA24 is assigned as the third bit of the layer number, the detection result is different between the layer numbers 0 to 3 (201) and the layer numbers 4 to 7 (202). In the case of the layer numbers 0 to 3 (201), the bits PAAW1-0 are input as 0, 1, 2, 0, 1, 2 . . . to the low-order continuity detection circuit 304. Therefore, the bit PAA24 is output as "0" and the bits PAA1-0 as bits PAAW1-0 as they are. In the case of the layer numbers 4 to 7 (202), on the other hand, the bits PAAW1-0 are input as 3, 2, 1, 3, 2, 1, . . . to the low-order continuity detection circuit 304. In the process, by detecting the address detection value "3" or the decrement of the continuity, the execution of the scramble process at the time of address generation is detected, and the bit PAA24 is output as "1". Also, with regard to the low-order bits PAA1-0, the value of the bits PAAW1-0 after descramble is output as 0, 1, 2, 0, 1, 2, . . . . As a result, the in-cluster count value (bits PAA1-0) (312) is detected as the output of the low-order continuity detection circuit 304, and further, the layer number address (bits PAA24-22) (310) is generated and the layer number is detected by the layer number detection circuit 302 from the generated bit PAA24 and the bits PAAW23-22 (306) detected from the wobble. Also, from the bits PAAW21-2 (307) detected from the wobble, the cluster number address (bits PAA21-2) (311) is generated and the cluster number is detected by the high-order address detection circuit 303. In this way, the addresses obtained from the detection circuits 302, 303, 304, respectively, are input to the PAA address generating circuit 305 and thus can be transformed to the address of the bits PAA24-0.

As described above, the address is generated by embedding the virtual bits in other bits as information, and the address is restored at the time of detection. In this way, the number of bits of the address indicating the physical position can be extended without changing the address structure of the wobble or without increasing the number of bits of the address embedded in the wobble. In the case where the 2-bit layer number and the 20-bit cluster number are assigned to the physical ADIP address in the Blu-ray Disc, and the address of the layer number is extended with virtual bits, the concept is applicable to the disc with the layer numbers of up to eight layers and up to 64 gigabytes. Similarly, in the case where the address of the layer number is extended by assigning the 3-bit layer number and to 19-bit cluster number to the address as in the prior art, the concept is applicable to the disc having the layer numbers of up to 16 layers and 32 gigabytes per layer. Incidentally, according to this embodiment, the virtual bits are controlled in the off state of the scramble process for the layer numbers 0 to 3. As a result, the same value is obtained for the bits PAA23-0 and the bits PAAW23-0, and therefore, the compatibility with the conventional optical disc can be maintained.

Figure 12:
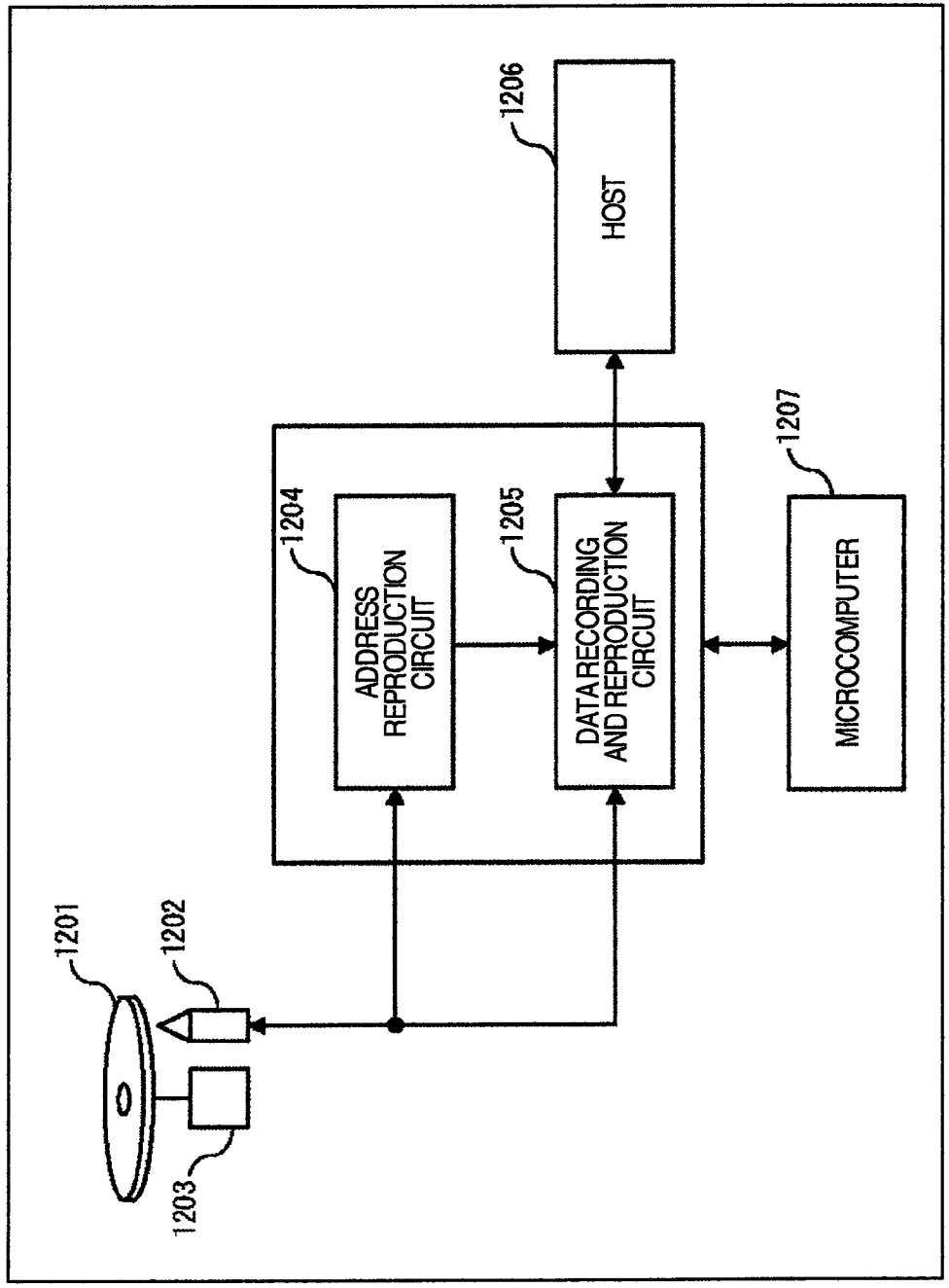
FIG. 12 is a recording and reproduction apparatus for an optical disc according to the first embodiment of the invention.

FIG. 12 shows an example of the recording and reproduction apparatus for recording and reproducing the data in and from the optical disc produced with the address generated as explained in this embodiment. Numeral 1201 designates an optical disc, numeral 1202 a pickup, numeral 1203 a spindle motor, numeral 1204 an address reproduction circuit, numeral 1205 a data recording and reproduction circuit, numeral 1206 an external host and numeral 1207 a microcomputer for coordinating the system as a whole. The wobble signal, which has been read, through the pickup 1202, from the optical disc 1201 produced using the address generation method shown in FIG. 1, is input to the address reproduction circuit 1204 thereby to detect the address information. As a result, a configuration using the address detection circuit as explained in FIG. 3 makes it possible to detect the position at which the data is recorded and reproduced. At the same time, the data obtained through the pickup 1202 and the data recording and reproduction circuit 1205 can be input to and output from the host 1206 on the one hand, and recorded and reproduced on the other hand.

Figure 4:
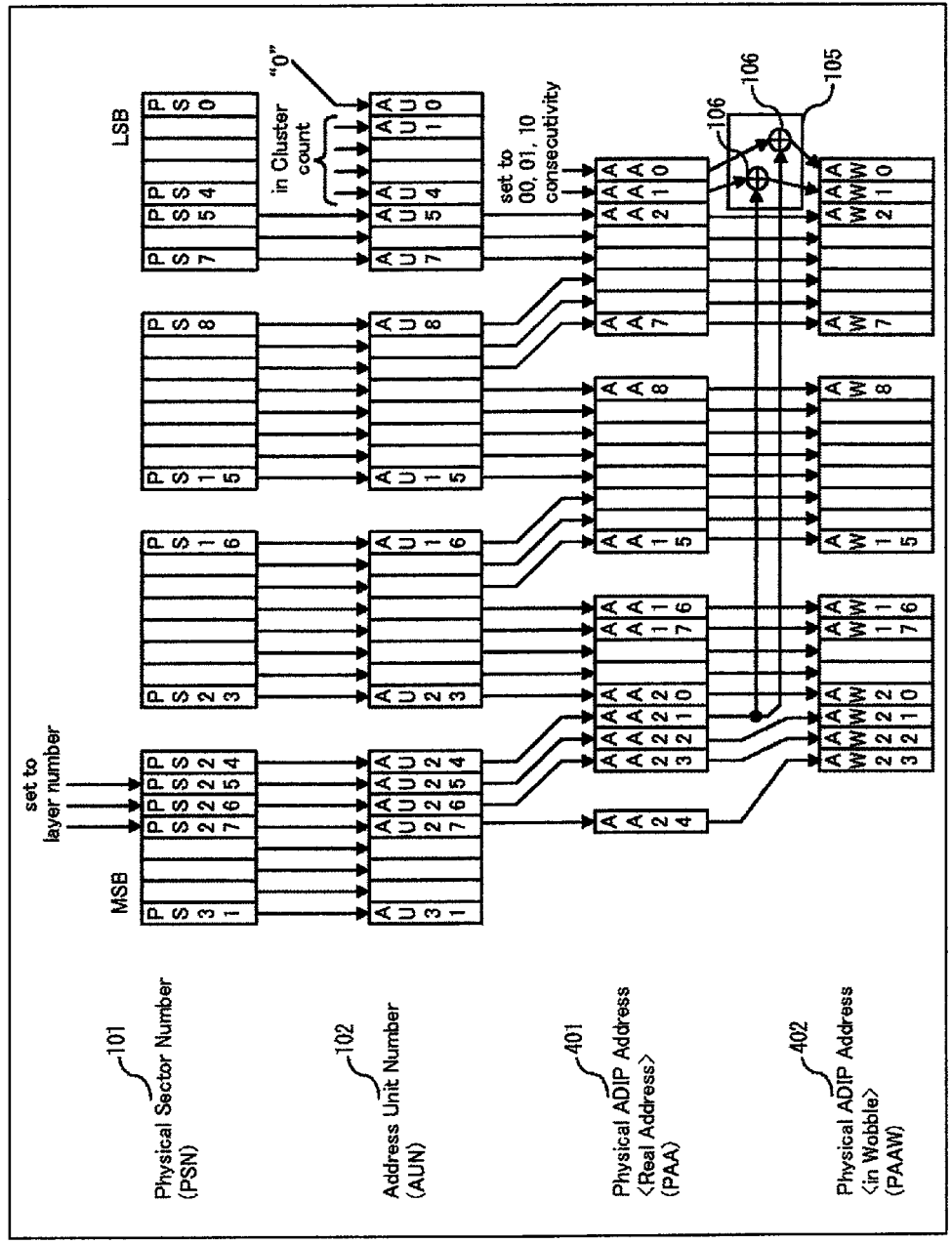
FIG. 4 is a diagram showing the correlation of the addresses of a multilayer optical disc according to a second embodiment of the invention.

FIG. 4 is a diagram showing the correlation of the addresses in the multilayer optical disc according to a second embodiment of the invention. The difference from FIG. 1 lies in that the bit PAA21 but not the bit PAA24 is assigned as a virtual bit. Like in FIG. 1, numeral 401 designates the real address of the physical ADIP address (hereinafter PAA), and numeral 402 the wobble-embedded address (hereinafter PAAW) of the physical ADIP address. This embodiment is different only in bit assignment and identical with the first embodiment in all the other points. As an address generation method, like in the first embodiment, the bit PAA21 is input as a control bit for determining the on/off state of the scramble process in the scramble circuit 105, and the two low-order bits (PAA1-0) are scrambled and embedded in the wobble.

Figure 5:
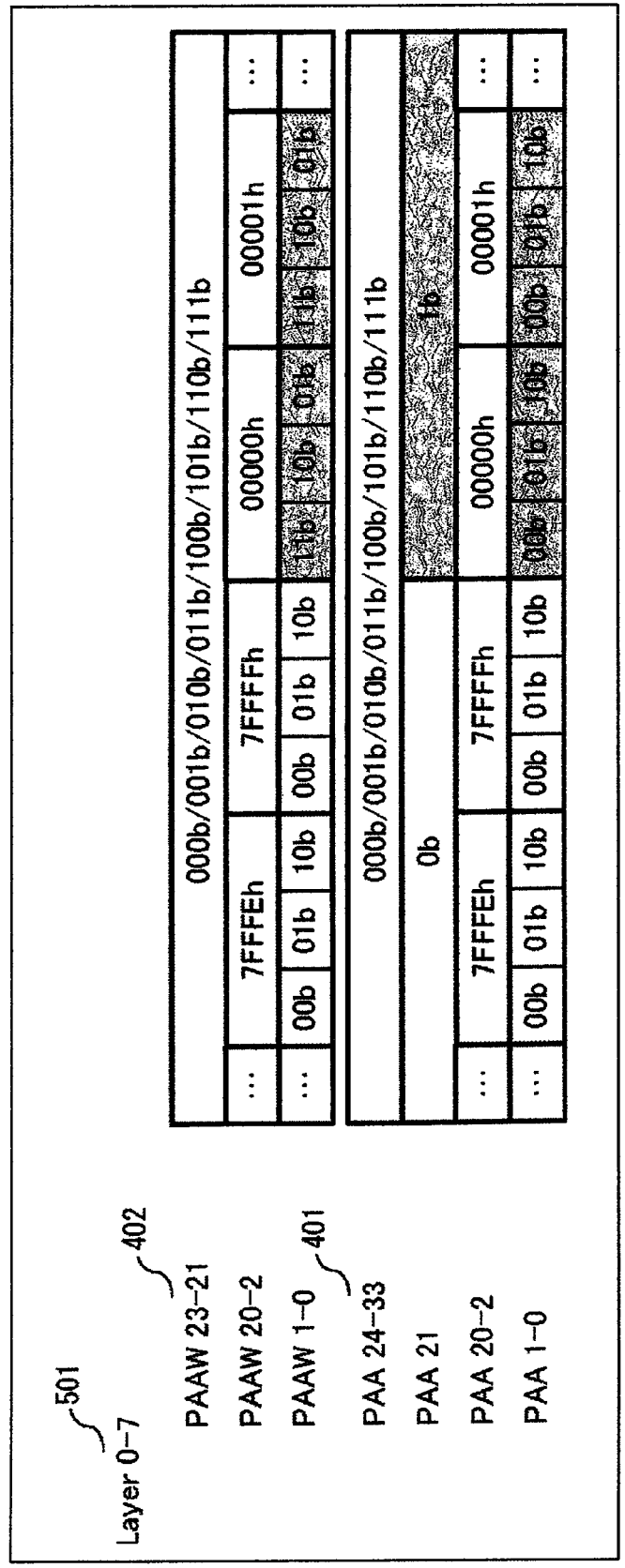
FIG. 5 is a timing chart for address detection according to the second embodiment of the invention.
Figure 6:
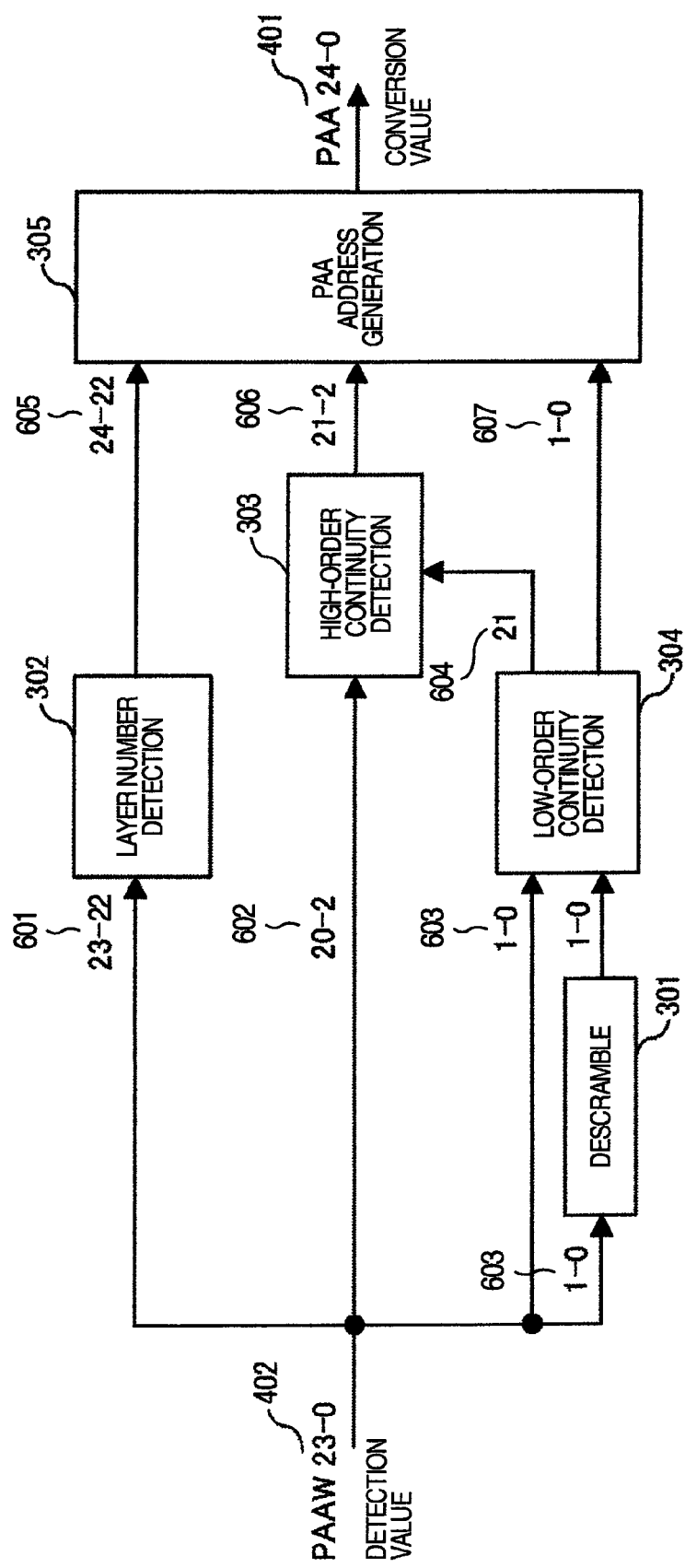
FIG. 6 is a diagram showing a detection circuit for detecting the address according to the second embodiment of the invention.

A method of detecting the address PAAW embedded in the wobble is explained with reference to the timing chart of FIG. 5 and an example of the detection circuit shown in FIG. 6. According to this embodiment, the virtual bit PAA21 is assigned not to the layer number address but to the cluster number address, and therefore, the switching of address generation occurs in each layer. Also, the two low-order bits (PAA1-0) (603) are applied through the exclusive-OR 106 as a scramble method. Like in the aforementioned case, therefore, the virtual bit PAA21 (604) is generated and the bits PAA1-0 (607) are detected by detecting the execution or non-execution of the scramble process in the low-order continuity detection circuit 304. As a result, the in-cluster count value (bits PAA1-0) is detected as an output of the low-order continuity detection circuit 304. Further, the cluster number address (bits PAA21-2) (606) is generated and the cluster number is detected by the high-order address detection circuit 303 using the bit PAA21 detected by the low-order continuity detection circuit 304 and the bits PAAW20-2 (602) detected from the wobble. Also, the layer number address (bits PAA24-22) (605) is detected using the bits PAAW23-22 (601) detected from the wobble. Thus, the address obtained from each of the detection circuits 302, 303, 304 is input to the PAA address generating circuit 305 and can be transformed to the address of the bits PAA24-0 (401).

As described above, the virtual bits are embedded in other bits as information to generate an address, and by restoring the address at the time of detection, the number of bits of the address indicating the physical position can be extended without changing the address structure of the wobble and without increasing the number of bits of the address embedded in the wobble. Unlike in the first embodiment, the address can be generated and detected similarly also by assigning the virtual bit not to the layer number but to the cluster number address of each layer. Also, like in the case shown in FIG. 12, the position where the data is recorded or reproduced can be detected by use of the address detection circuit explained with reference to FIG. 6, also in the reproduction apparatus for reproducing the data from and the recording apparatus for recording the data in the optical disc produced with the addresses generated as explained in this embodiment.

Figure 7:
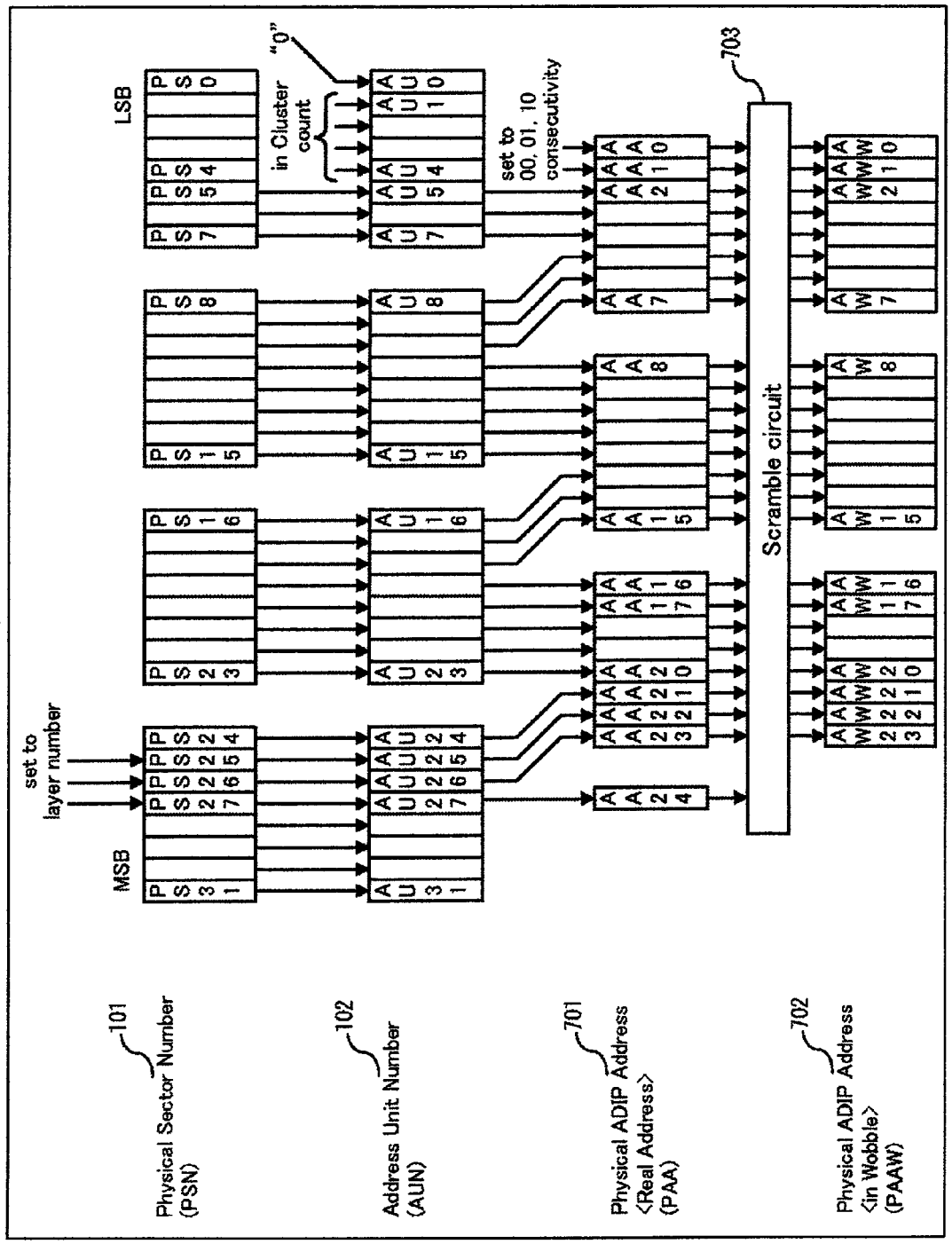
FIG. 7 is a diagram showing the correlation of the addresses of a multilayer optical disc according to a third embodiment of the invention.
Figure 8:
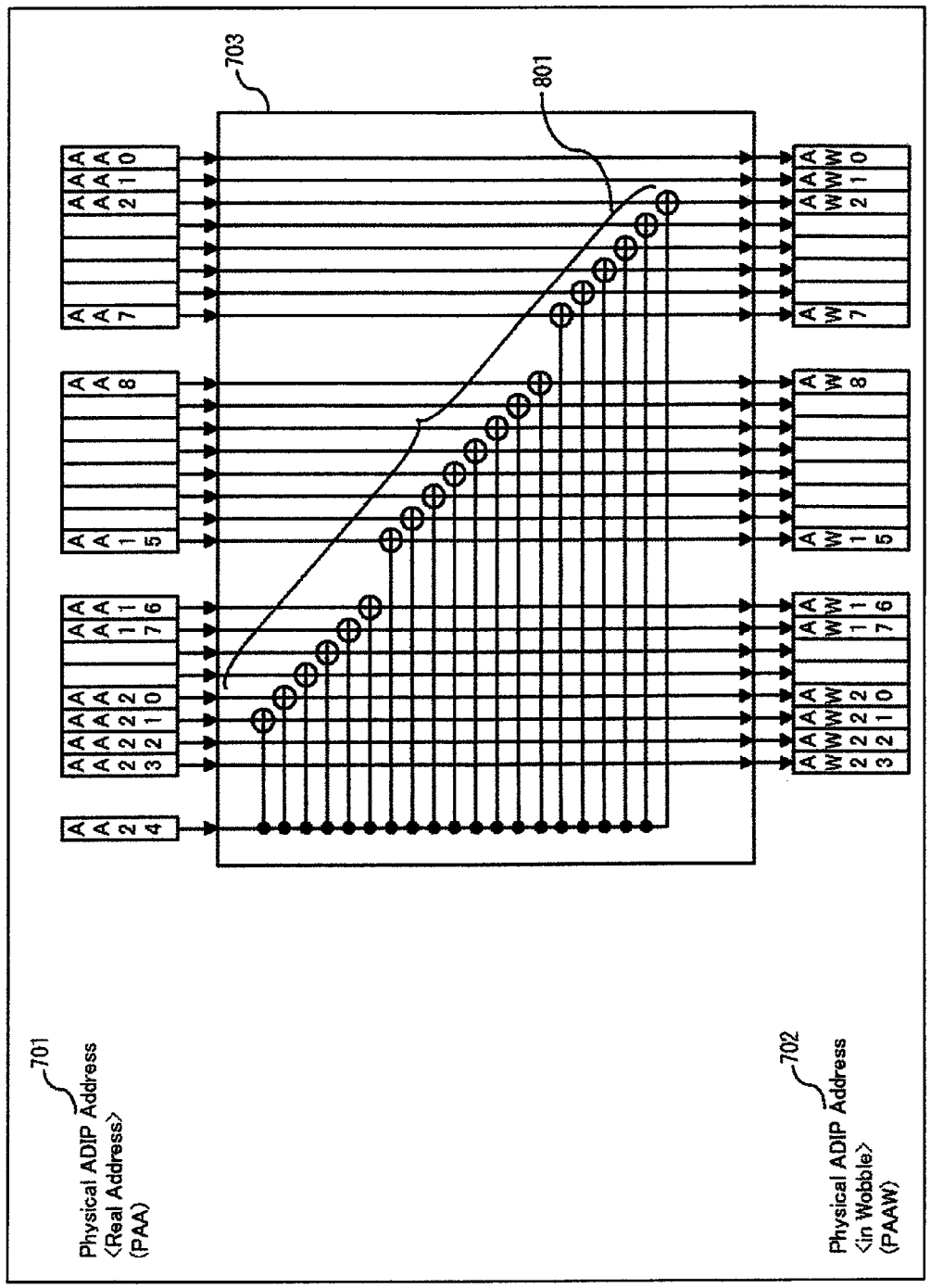
FIG. 8 shows an example of a scramble circuit according to the third embodiment of the invention.

FIG. 7 is a diagram showing the correlation of the addresses in a multilayer optical disc according to a third embodiment of the invention. The difference from FIG. 1 lies in that not only the two low-order bits PAA1-0 but also all the bits PAA23-0 are scrambled. Like in FIG. 1, numeral 701 designates the real address of the physical ADIP address (hereinafter PAA), numeral 702 the wobble-embedded address of the physical ADIP address (hereinafter PAAW), and numeral 703 a scramble circuit. This embodiment, however, is different from the embodiment of FIG. 1 only in bit assignment, and identical with it in all the other points. An example of the scramble circuit 703 used for address generation is shown in FIG. 8. In the case of FIG. 8, the exclusive-OR 801 is used to produce the logic sum of the bits PAA24 and each of the bits PAA21-2 corresponding to the cluster number address, while the other bits are input/output as they are. Like in the prior art, therefore, the bits PAA21-2 are incremented as 0, 1, 2, 3, 4, 5, . . . , FFFFFh in the case where the bit PAA24 is "0". In the case where the bit PAA24 is "1", on the other hand, the bits PAA21-2, the value after the scramble process is assumed, and therefore, the bits PAA21-2 are decremented as FFFFFh, FFFFEh, FFFFDh, . . . , 0.

Figure 9:
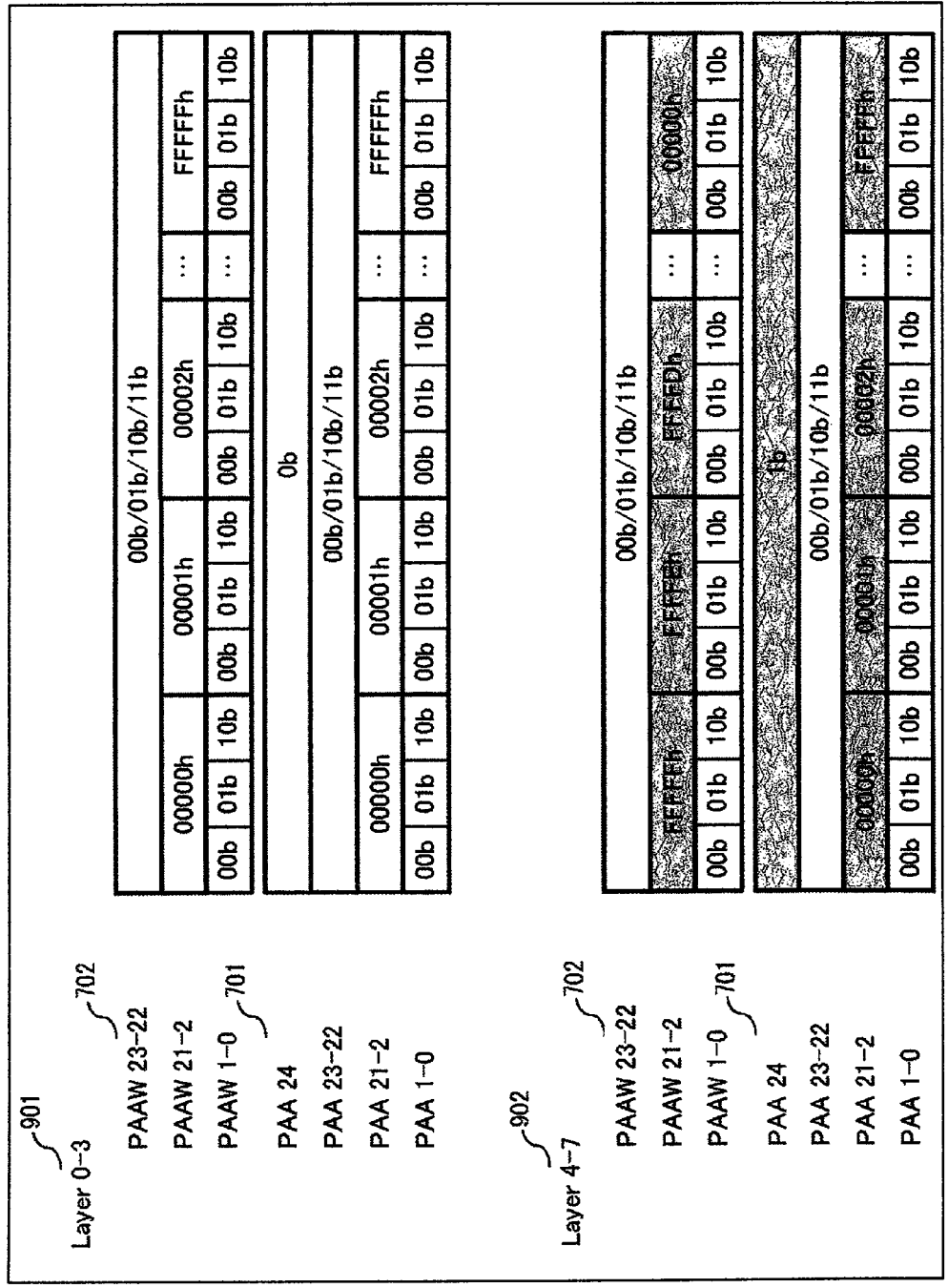
FIG. 9 is a timing chart for address detection according to the third embodiment of the invention.
Figure 10:
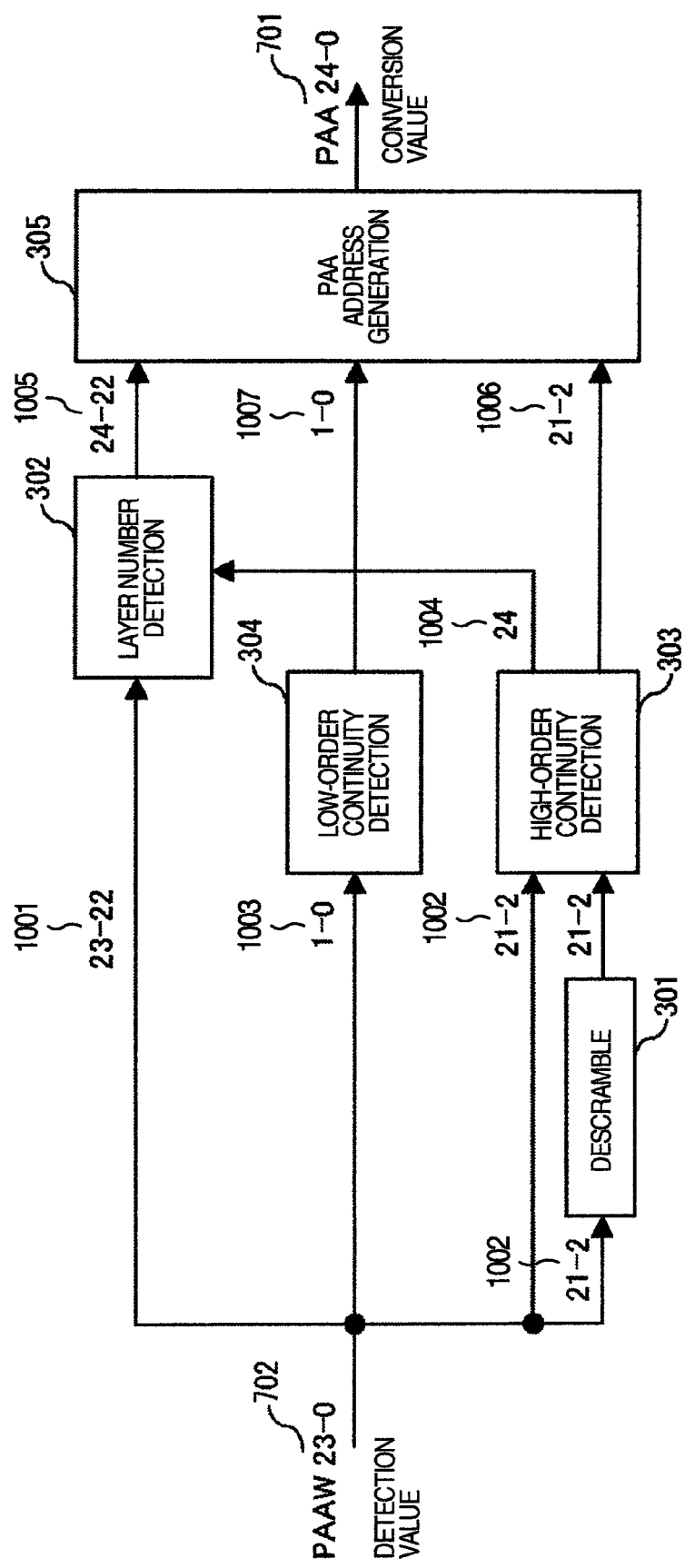
FIG. 10 is a diagram showing a detection circuit for detecting the address according to the third embodiment of the invention.

A method of detecting the address PAAW embedded in the wobble is explained with reference to the timing chart of FIG. 9 and an example of the detection circuit shown in FIG. 10. According to this embodiment, the bit PAA24 (1004), which is a virtual bit, is restored by checking the continuity of the high-order address of the bits PAAW21-2 (1002). Also, since the 20 high-order bits (PAA21-2) are processed by the exclusive-OR 801 as a scramble method, the high-order continuity detection circuit 303 detects the presence or absence of the scramble (the difference in continuity between increment and decrement in the case under consideration). In this way, the virtual bit PAA24 is generated and the bits PAA21-2 (1006) is detected. In the case of the layer numbers 0 to 3 (901), the bits PAAW21-2 are input to the high-order continuity detection circuit 303 as 0, 1, 2, 3, 4, 5, . . . , FFFFFh, and therefore, the bit PAA24 is output as "0" while the bits PAAW21-2 are output as they are. In the case of the layer numbers 4 to 7 (902), on the other hand, the bits PAAW21-2 are input to the high-order continuity detection circuit 303 as FFFFFh, FFFFEh, FFFFDh, . . . , 0. Therefore, the decrement is detected, the bit PAA24 is output as "1", and the value 0, 1, 2, 3, 4, 5, . . . , FFFFFh after the descramble process (the exclusive-OR of "1" and the bits PAAW21-2 in the case under consideration) is output. As a result, the cluster number address (bits PAA21-2) (1006) can be generated and the layer numbers detected as an output of the high-order continuity detection circuit 303. Further, from the bit PAA24 generated and the bits PAAW23-22 (1001) detected from the wobble, the layer number detection circuit 302 generates the layer number address (bits PAA24-22) (1005) and detects the layer number. Also, from the bits PAAW1-0 detected from the wobble, the low-order address detection circuit 304 detects the in-cluster count value (bits PAA1-0) (1007). Thus, the addresses obtained from the detection circuits 302, 303, 304, respectively, are input to the PAA address generating circuit 305 and can be transformed into the address of the bits PAA24-0 (701).

As described above, the virtual bit is embedded as information in other bits to generate an address, and by restoring the address at the time of detection, the number of bits of the address indicating the physical position can be extended without changing address structure of the wobble or without increasing the number of bits of the address embedded in the wobble. Unlike in the first embodiment, the address can be generated and detected similarly also by embedding the information of the virtual bit not only in a part of the address but also in the whole address. Also, like in FIG. 12, the position where the data is recorded and reproduced can be detected by use of the address detection circuit explained with reference to FIG. 10 also in the reproduction apparatus for reproducing the data from and the recording apparatus for recording the data in the optical disc produced with the addresses generated in the manner as explained in this embodiment.

Figure 11:
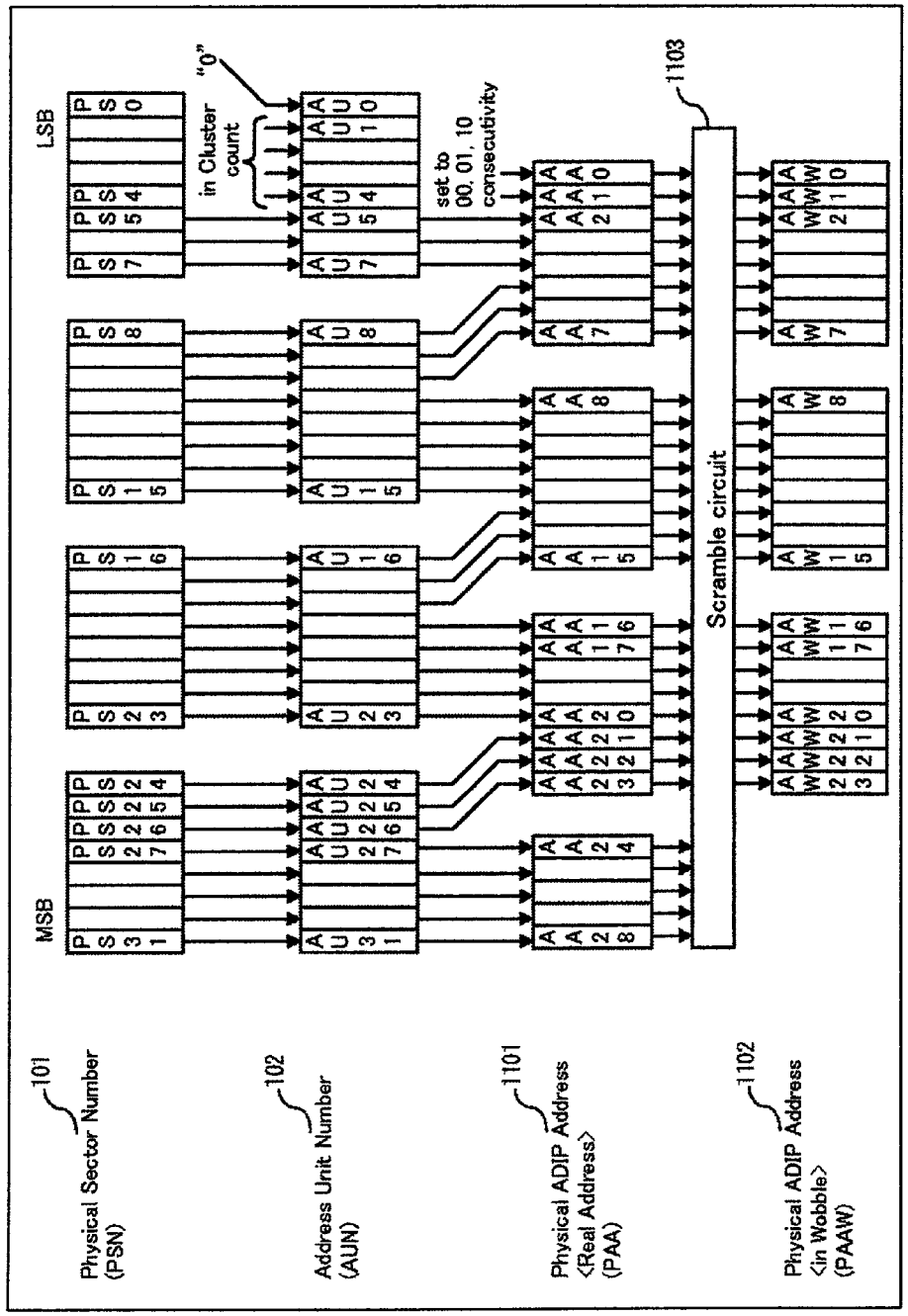
FIG. 11 is a diagram showing the address correlation of an optical disc according to a fourth embodiment of the invention.

FIG. 11 is a diagram showing the correlation of the addresses in the optical disc according to a fourth embodiment of the invention. The difference from FIG. 7 lies in that the five bits PAA28-24 corresponding to the bits PSN31-27 are used as virtual bits, and the PAA 1101 has a structure in which the bits PAA28-2 are assigned as a cluster number and the bits PAA1-0 as the in-cluster count value. Like in FIG. 7, numeral 1101 designates the real address of the physical ADIP address (hereinafter PAA), numeral 1102 the wobble-embedded address of the physical ADIP address (hereinafter PAAW), and numeral 1103 a scramble circuit. Nevertheless, this embodiment is different only in bit assignment, and identical with the embodiment shown in FIG. 7 in the other points. According to the scramble rule of the scramble circuit 1103, the information is embedded in a plurality of types of forms, which are switched by detecting each scramble rule (according to this embodiment, in $2^5$ (=32) ways due to the addition of five virtual bits). Thus, a plurality of virtual bits can be generated and detected similarly.

As described above, the virtual bits are embedded as information in other bits to generate an address, and by restoring the address at the time of detection, the number of bits of the address indicating the physical position can be extended without changing the address structure of the wobble or without increasing the number of bits of the address embedded in the wobble. Unlike in the first to third embodiments, the address can be generated and detected similarly in the case where a plurality of virtual bits are extended as well as in the case where one virtual bit is extended. Although the first to third embodiments are explained with reference to the address configured of the layer number and the cluster number and this embodiment with reference to the address configured only of the cluster number, the address can be generated and detected similarly in both cases. Also, like in FIG. 12, the position where the data is recorded and reproduced can be detected in the reproduction apparatus for reproducing the data from the optical disc and the recording apparatus for recording the data in the optical disc produced with the addresses generated as explained in this embodiment.

The embodiments are described above with reference to the scramble method in which the information is embedded using the scramble circuit as an example (designated by numeral 105 in FIGS. 1 and 4, and numeral 703 in FIGS. 7 and 8). This invention, however, is not limited to such a circuit, and similarly applicable to a circuit or a method in which the information can be embedded and detected by the bit operation.

Also, the number of virtual bits, the position where the virtual bits are arranged, the bit position where the information such as the scramble information is embedded or the bit position the where an arrangement is converted within address and the bit structure of the address are also not limited to those described in the embodiments. The virtual bits are arranged, however, better at a position where the change occurs less frequently as an address taking the detection stability into consideration. Also, the scramble information is embedded better at the bit position where the change occurs less frequently as an address taking the detection time into consideration.

Further, although the embodiments are explained above with reference to the optical disc as a medium and the wobble-embedded address as an address, the invention is not limited to these embodiments, but applicable to any concept of reducing the bits in such a manner that the number of bits of the address read is less than the number of bits of the address generated. Furthermore, the virtual bits, though explained as an address not embedded in the wobble, may be stored in a different area other than the address read and used at the time of detection.

Specifically, the recording medium according to this embodiment may be so structured that the extension bits are recorded in an area different from the area where the address is recorded.

Also, the recording medium according to this embodiment may be configured of n (n: natural number) extension bits, so that the rule for conversion to the address can be switched in $2^n$ ways.

Also, as described above, according to this embodiment, there is provided a reproduction apparatus for reproducing the data from a recording medium having an area for recording a plurality of data and the addresses indicating the physical recording position corresponding to the data, wherein the virtual bits for the conversion or non-conversion or switching the regularity of the address are used as extension bits of the address, wherein the data is reproduced from the recording medium having recorded therein the address after conversion or regularity switching, and wherein the virtual bits are generated by detection of the conversion or non-conversion or the regularity of the address recorded in the recording medium, and the data is reproduced by detecting the data reproduction position, according to the generated virtual bits and an address calculated by an inverse transformation of an address converted or switched as to a regularity of the address and recorded in the recording medium.

Also, as described above, according to this embodiment, there is provided a reproduction apparatus for reproducing the data from a recording medium having a plurality of recording layers and an area for recording the data in a plurality of cluster structures, wherein an address indicating the physical recording position in the recording medium is configured of the layer number address indicating the number of the plurality of the recording layers, the cluster number address indicating the data positions of the plurality of the clusters and the in-cluster count value indicating the physical position in the clusters, wherein the virtual bits for conversion or non-conversion to or switching the regularity of the in-cluster count values are used as extension bits of the layer number address, wherein the data is reproduced from the recording medium having recorded therein the layer number address, the cluster number address and the in-cluster count value after the conversion or regularity switching, and wherein the virtual bits are generated by detection of the conversion or non-conversion or the regularity of the in-cluster count value recorded in the recording medium, the recording layer number is detected by the virtual bits thus generated and the layer number address detected from the recording medium, the data position of the cluster is detected from the cluster number address detected from the recording medium, and the in-cluster count value is detected by an inverse transformation of the in-cluster count value converted or switched as to a regularity of the address and recorded in the recording medium, thereby to reproduce the data.

Also, according to this embodiment, there is provided a reproduction apparatus, wherein the virtual bits are generated by detection of the conversion or non-conversion or the regularity of the in-cluster count value recorded in the recording medium, wherein the cluster data position is detected by the virtual bits thus generated and the cluster number address detected from the recording medium, wherein the recording layer number is detected from the layer number address detected from the recording medium, and wherein the in-cluster count value is detected by an inverse transformation of the in-cluster count value converted or switched as to a regularity of the address and recorded in the recording medium, thereby to reproduce the data.

Also, according to this embodiment, there is provided a reproduction apparatus for reproducing the data from a recording medium having recorded therein the layer number address after the conversion or the regularity switching, the cluster number address after the conversion or the regularity switching and the in-cluster count value after the conversion or the regularity switching, wherein the virtual bits are generated by detection of the conversion or non-conversion or the regularity of the address recorded in the recording medium, the recording layer number is detected by the generated virtual bits and an address calculated by an inverse transformation of the layer number address converted or switched as to a regularity of the address and recorded in the recording medium, and the cluster data position is detected by an inverse transformation of the cluster number address converted or switched as to a regularity of the cluster number address and recorded in the recording medium, and the in-cluster count value is detected by an inverse transformation of the in-cluster count value converted or switched as to a regularity of the in-cluster count value and recorded in the recording medium, and thereby to reproduce the data.

Also, according to this embodiment, there is provided a reproduction apparatus for reproducing the data from a recording medium having an area for recording the data having a structure of a plurality of clusters, wherein an address indicating the physical recording position in the recording medium is configured of the cluster number address indicating the data position of the plurality of clusters in the plurality of the recording layers and the count value in the cluster, wherein the virtual bits for conversion or non-conversion to and the regularity of the address are used as extension bits of the cluster number address, wherein the data is reproduced from the recording medium having recorded therein the cluster number address after conversion or regularity switching and the in-cluster count value after the conversion or the regularity switching, and wherein virtual bits are generated by detection of the conversion or non-conversion or the regularity of the address recorded in the recording medium, the cluster data position is detected by the generated virtual bits and an address calculated by an inverse transformation of the cluster number address converted or switched as to a regularity of the address and recorded in the recording medium, and the in-cluster count value is detected by an inverse transformation of the in-cluster count value converted or switched as to a regularity of the in-cluster count value and recorded in the recording medium, and thereby to reproduce the data.

Also, as described above, according to this embodiment, there is provided a recording apparatus for recording the data in a recording medium having an area for recording a plurality of data and an address indicating the physical recording position corresponding to the data, wherein the virtual bits for conversion or non-conversion to or switching the regularity of the address are used as extension bits of the address;

wherein the data is recorded in the recording medium having recorded therein the address after the conversion or the regularity switching; and wherein the virtual bits are generated by the detection of the conversion or non-conversion of and the regularity of the address recorded in the recording medium, and a data recording position is detected by the generated virtual bits and an address calculated by an inverse transformation of an address converted or switched as to a regularity of the address and recorded in the recording medium, and thereby to record the data.

Also, according to this embodiment, there is provided a recording apparatus for recording the data in a recording medium having a plurality of recording layers and an area for recording the data structured of a plurality of cluster, wherein the address indicating the physical recording position in the recording medium is configured of the layer number address indicating a plurality of the recording layer numbers, the cluster number address indicating the data position of the plurality of the clusters, and the in-cluster count value indicating the physical position in the cluster, wherein the virtual bits for conversion or non-conversion to or switching the regularity of the in-cluster count value are used as extension bits of the layer number address, wherein the data is recorded in the recording medium having recorded therein the layer number address, the cluster number address and the in-cluster count value after conversion or regularity switching, wherein the virtual bits are generated by detection of the conversion or non-conversion or the regularity of the in-cluster count value recorded in the recording medium, the recording layer number is detected by the generated virtual bits and the layer number address detected from the recording medium, the cluster data position is detected from the cluster number address detected from the recording medium, and the in-cluster count value is detected by an inverse transformation of the in-cluster count value converted or switched as to a regularity of the in-cluster count value and recorded in the recording medium, and thereby to record the data.

Also, according to this embodiment, there is provided a recording apparatus, wherein the virtual bits are generated by the detection of the conversion or non-conversion or the regularity of the in-cluster count value recorded in the recording medium, the cluster data position is detected by the generated virtual bits and the cluster number address detected from the recording medium, the recording layer number is detected from the layer number address detected from the recording medium, and the in-cluster count value is detected by an inverse transformation of the in-cluster count value converted or switched as to a regularity of the in-cluster count value and recorded in the recording medium, and thereby to record the data.

Also, according to this embodiment, there is provided a recording apparatus for recording the data in a recording medium having recorded therein the cluster number address after conversion or regularity switching, and the in-cluster count value after conversion or regularity switching, wherein the virtual bits are generated by the detection of the conversion or non-conversion or the regularity switching of the address recorded in the recording medium, the cluster data position is detected by the generated virtual bits and an address calculated by an inverse transformation of the cluster number address converted or switched as to a regularity of the cluster number address and recorded in the recording medium, and the in-cluster count value is detected by an inverse transformation of the in-cluster count value converted and switched as to a regularity of the in-cluster count value and recorded in the recording medium, and thereby to record the data.

Also, according to this embodiment, there is provided a recording apparatus for recording the data in a recording medium having recorded therein a area for recording the data structured with a plurality of clusters, wherein an address indicating the physical position of the recording medium is configured of the cluster number address indicating the data position of a plurality of clusters in the plurality of the recording layers, and the in-cluster count value indicating the physical position in the cluster, wherein the virtual bits for conversion or non-conversion to or switching the regularity of the address are used as the extension bits of the cluster number address, wherein the data are recorded in a recording medium having recorded therein the cluster number address after the conversion or the regularity switching and the in-cluster count value after the conversion or the regularity switching, and wherein the virtual bits are generated by detection of the conversion or non-conversion or the regularity of the address recorded in the recording medium, the cluster data position is detected by the generated virtual bits and an address calculated by an inverse transformation of the cluster number address converted or switched as to a regularity of the cluster number address and recorded in the recording medium, and the in-cluster count value is detected by an inverse transformation of the in-cluster count value converted or switched as to a regularity of the in-cluster count value and recorded in the recording medium.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An address detection method for a recording medium having an area for recording a plurality of data and an address indicating a physical recording position corresponding to the data, wherein:

virtual bits are used as extension bits of the address;
the address is embedded in a wobble;
the area has a plurality of recording layers and a plurality of cluster structures;
the address is configured by a layer number address indicating numbers of the plurality of the recording layers, a cluster number address indicating a data position of the plurality of the clusters and an in-cluster count value indicating a physical position in the cluster;
the virtual bits indicate a switching of a regularity of two low-order bits of the address, and are used as extension bits of the cluster number address;
the regularity of two low-order bits indicates whether an increment is repeated in the two low-order bits;
the cluster number address is extended by using the virtual bits without changing a number of address bits embedded in the wobble;
the virtual bits are generated by detecting the regularity of two low-order bits; and
a data position of clusters is detected from the generated virtual bits and the cluster number address.

2. A recording medium having an area for recording a plurality of data and an address indicating a physical recording position corresponding to the data, wherein:
virtual bits are used as extension bits of the address;
the address is embedded in a wobble;
the area has a plurality of recording layers and a plurality of cluster structures;
the address is configured by a layer number address indicating numbers of the plurality of the recording layers, a cluster number address indicating a data position of the plurality of the clusters and an in-cluster count value indicating a physical position in the cluster;
the virtual hits indicate a switching of a regularity of two low-order bits of the address, and are used as extension bits of the cluster number address;
the regularity of two low-order bits indicates whether an increment is repeated in the two low-order bits; and
the cluster number address is extended by using the virtual bits without changing a number of address bits embedded in the wobble.

3. An address generating method for a recording medium having an area for recording a plurality of data and an address indicating a physical recording position corresponding to the data, wherein:
virtual bits are used as extension bits of the address;
the address is embedded in a wobble;
the area has a plurality of recording layers and a plurality of cluster structures;
the address is configured by a layer number address indicating numbers of the plurality of the recording layers, a cluster number address indicating a data position of the plurality of the clusters and an in-cluster count value indicating a physical position in the cluster;
the virtual bits indicate a switching of a regularity of two low-order bits of the address, and are used as extension bits of the cluster number address;
the regularity of two low-order bits indicates whether an increment is repeated in the two low-order bits;
the cluster number address is extended by using the virtual bits without changing a number of address bits embedded in the wobble; and
the layer number address, the cluster number address and the in-cluster count value after switching the regularity are recorded in a recording medium.

4. An reproducing method for a recording medium having an area for recording a plurality of data and an address indicating a physical recording position corresponding to the data, wherein:
virtual bits are used as extension bits of the address;
the address is embedded in a wobble;
the area has a plurality of recording layers and a plurality of cluster structures;
the address is configured by a layer number address indicating numbers of the plurality of the recording layers, a cluster number address indicating a data position of the plurality of the clusters and an in-cluster count value indicating a physical position in the cluster;
the virtual bits indicate a switching of a regularity of two low-order bits of the address, and are used as extension bits of the cluster number address;
the regularity of two low-order bits indicates whether an increment is repeated in the two low-order bits;
the cluster number address is extended by using the virtual bits without changing a number of address bits embedded in the wobble;
the virtual bits are generated by detecting the regularity of two low-order bits; and
a data reproduction position of clusters is detected from the generated virtual bits and the cluster number address, and data is reproduced.

5. An recording method for a recording medium having an area for recording a plurality of data and an address indicating a physical recording position corresponding to the data, wherein:
virtual bits are used as extension bits of the address;
the address is embedded in a wobble;
the area has a plurality of recording layers and a plurality of cluster structures;
the address is configured by a layer number address indicating numbers of the plurality of the recording layers, a cluster number address indicating a data position of the plurality of the clusters and an in-cluster count value indicating a physical position in the cluster;
the virtual bits indicate a switching of a regularity of two low-order bits of the address, and are used as extension bits of the cluster number address;
the regularity of two low-order bits indicates whether increment is repeated in the two low-order bits;
the cluster number address is extended by using the virtual bits without changing a number of address bits embedded in the wobble;
the virtual bits are generated by detecting the regularity of two low-order bits; and
a data recording position of clusters is detected from the generated virtual bits and the cluster number address, and the data is recorded.

* * * * *